(12) United States Patent
Iezzi

(10) Patent No.: US 11,499,001 B2
(45) Date of Patent: Nov. 15, 2022

(54) SINGLE-COMPONENT POLYSILOXANE NON-SKID / NON-SLIP COATINGS

(71) Applicant: The Government of the United States of America, as represented by the Secretary of the Navy, Arlington, VA (US)

(72) Inventor: Erick B. Iezzi, Mars, PA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 337 days.

(21) Appl. No.: 16/733,268

(22) Filed: Jan. 3, 2020

(65) Prior Publication Data

US 2021/0206904 A1    Jul. 8, 2021

(51) Int. Cl.
| | | |
|---|---|---|
| *C08G 18/38* | (2006.01) | |
| *C08G 18/10* | (2006.01) | |
| *C08G 18/75* | (2006.01) | |
| *C08G 18/76* | (2006.01) | |
| *C08G 18/32* | (2006.01) | |
| *C08L 77/00* | (2006.01) | |

(Continued)

(52) U.S. Cl.
CPC ......... *C08G 18/3893* (2013.01); *C08G 18/10* (2013.01); *C08G 18/2865* (2013.01); *C08G 18/3206* (2013.01); *C08G 18/3212* (2013.01); *C08G 18/3225* (2013.01); *C08G 18/755* (2013.01); *C08G 18/7664* (2013.01); *C08K 3/013* (2018.01); *C08L 77/00* (2013.01); *C09D 183/08* (2013.01); *C08K 2201/003* (2013.01)

(58) Field of Classification Search
CPC .................. C08G 18/289; C08G 18/3893; C09D 183/08; C08L 75/00–10
See application file for complete search history.

(56) References Cited

U.S. PATENT DOCUMENTS 3,350,330 A * 10/1967 Bessmer ................. C08K 9/06
523/213
3,652,485 A *  3/1972 Cizek ...................... B63B 3/48
524/451

(Continued)

FOREIGN PATENT DOCUMENTS

CN         104194434 A      12/2014

OTHER PUBLICATIONS

Search Report and Written Opinion in PCT/US2020/037825.

*Primary Examiner* — Michael M Dollinger
(74) *Attorney, Agent, or Firm* — US Naval Research Laboratory; Joseph T Grunkemeyer

(57) ABSTRACT

Disclosed is a composition having: an organosilane polymer, a polyamide polymer; and an abrasive aggregate. The organosilane is made by: reacting an amino-functional alkoxysilane with one or more polyisocyanates to form one or more adducts having an unreacted isocyanate group; and reacting the adducts with one or more polyfunctional amino- and/or hydroxyl compounds so that the polymer contains no unreacted isocyanate groups. The polyfunctional amino- and/or hydroxyl compound has a cycloaliphatic group or an aromatic group. The composition can be used to make a single-component polysiloxane non-skid/non-slip coating that is applied by rolling, spraying, or troweling and cures with atmospheric moisture.

11 Claims, 3 Drawing Sheets

(51) Int. Cl.
*C08K 3/013* (2018.01)
*C09D 183/08* (2006.01)
*C08G 18/28* (2006.01)

(56) References Cited

U.S. PATENT DOCUMENTS

| | | | |
|---|---|---|---|
| 8,133,964 B2 * | 3/2012 | Iezzi | C08G 18/289 |
| | | | 528/25 |
| 9,006,307 B2 | 4/2015 | Iezzi | |
| 9,034,946 B2 | 5/2015 | Iezzi | |
| 9,139,753 B2 | 9/2015 | Iezzi | |
| 9,540,543 B2 | 1/2017 | Iezzi | |
| 9,587,143 B2 | 3/2017 | Iezzi | |
| 9,701,868 B2 | 7/2017 | Iezzi | |
| 10,190,020 B2 | 1/2019 | Iezzi | |
| 2010/0247929 A1 | 9/2010 | Oertli et al. | |
| 2011/0224327 A1 | 9/2011 | Kardash et al. | |
| 2016/0312064 A1 | 10/2016 | Iezzi | |
| 2017/0183534 A1 * | 6/2017 | Iezzi | C08G 18/6685 |

\* cited by examiner

SINGLE-COMPONENT POLYSILOXANE NON-SKID / NON-SLIP COATINGS

TECHNICAL FIELD

The present disclosure is generally related to polysiloxane coatings.

DESCRIPTION OF RELATED ART

Non-skid/non-slip coatings are viscous materials that provide an aggressive surface once rolled, sprayed, or brushed. These materials are used on the exterior and interior decks of surface ships to provide traction for aircraft, sailors, and equipment when at sea. Similar materials, although with a less aggressive profile, are used to provide traction on the exterior of aerospace ground support equipment, in the beds of ground vehicles, and on the wings of helicopters.

For Navy surface ships, traditional non-skid coatings are viscous two-component (2K) materials that contain epoxy- and amine-functional molecules, pigments, solvents, fillers, thickening agents, and an abrasive aggregate. These components are mixed together using mechanical equipment, then applied on ship decks via a napless phenolic roller or spray pump. Navy nonskid coatings are qualified to MIL-PRF-24667 requirements and must be present on decks where flight operations occur. Unfortunately, epoxy-amine non-skid coatings often fail before their required service life is reached due to degradation from sunlight that results in loss of abrasive profile and color change, delamination from the deck due to insufficient adhesion to the underlying primer, or peak breakage that generates foreign object debris (FOD). Sailors will often apply primer in areas where the non-skid has delaminated in effort to prevent corrosion and further delamination, yet they do not have the ability to apply additional nonskid because they are unable to mix these viscous materials by hand. As a result, areas of ship decks often remain without an abrasive surface during times of deployment, not to mention that the decks have an unsightly spotted appearance when covered with patches of nonskid and bare primer.

BRIEF SUMMARY

Disclosed herein is a composition comprising: an organosilane polymer, a polyamide polymer; and an abrasive aggregate. The organosilane polymer is made by a method comprising: reacting an amino-functional alkoxysilane with one or more polyisocyanates to form one or more adducts having an unreacted isocyanate group; and reacting the adducts with one or more polyfunctional amino- and/or hydroxyl compounds to form the polymer. The polyfunctional amino- and/or hydroxyl compound comprises a cycloaliphatic group or an aromatic group. The organosilane polymer contains no unreacted isocyanate groups.

BRIEF DESCRIPTION OF THE DRAWINGS

A more complete appreciation will be readily obtained by reference to the following Description of the Example Embodiments and the accompanying drawings.

DETAILED DESCRIPTION OF EXAMPLE EMBODIMENTS

Figure 1:
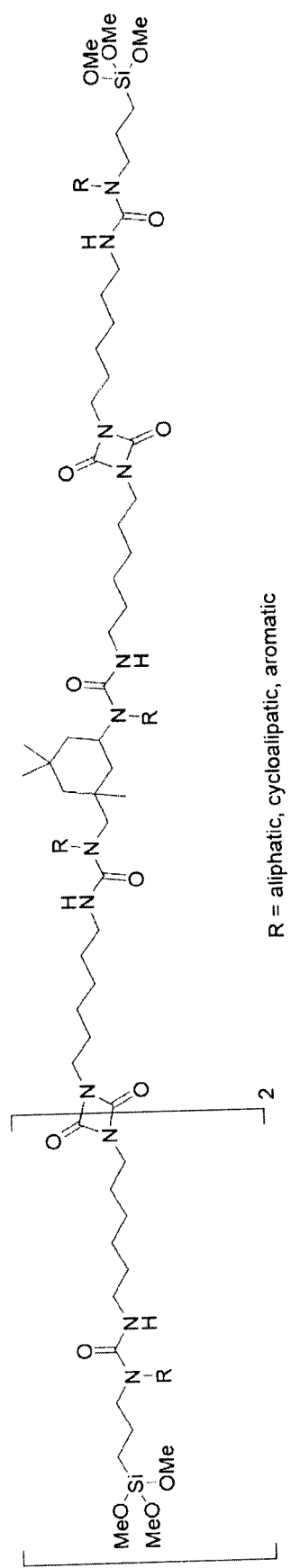
FIG. 1 shows an example cycloaliphatic-containing organosilane polymer.

In the following description, for purposes of explanation and not limitation, specific details are set forth in order to provide a thorough understanding of the present disclosure. However, it will be apparent to one skilled in the art that the present subject matter may be practiced in other embodiments that depart from these specific details. In other instances, detailed descriptions of well-known methods and devices are omitted so as to not obscure the present disclosure with unnecessary detail.

Polysiloxane coatings, which contain silicon-oxygen bonds, have become increasing popular within the global coatings market due to their outstanding external durability, chemical resistance, and increased thermal stability compared to coatings based on all-organic polymers. A single-component (IK) polysiloxane non-skid/non-slip coating overcomes limitations of 2K epoxy-based coatings by providing a material that does not require the metering and mixing of components, can be rolled or sprayed, and provides a durable and color-retentive abrasive surface when exposed to sunlight.

The single-component polysiloxane non-skid/non-slip coatings described herein are based on synthesized organosilane polymers that contain a cycloaliphatic and/or aromatic unit in the backbone and are terminated with alkoxysilane groups. These 1K nonskid coatings also contain an amide-containing polymer and abrasive aggregate, in addition to fillers, pigments, solvents, additives, and catalysts. The coatings can be rolled, sprayed, brushed, or troweled onto a surface. Once applied, the alkoxysilane groups within the polymer will hydrolyze with moisture to form silanols. These silanols will subsequently condense to form a hard polysiloxane/sol-gel network to provide the durable non-skid/non-slip coating.

The organosilane polymer can be synthesized using a variety of molecules, although it must comprise a cycloaliphatic or aromatic unit in the backbone. These molecules include: 1) isocyanate-functional molecules, such as aliphatic, cycloaliphatic, and aromatic di- or trifunctional isocyanates, 2) amine-functional alkoxysilane molecules, such as 3-aminopropyltrimethoxysilane, N-butyl-3-aminopropyltrimethoxysilane, and (N-cyclohexylmethyl)methyldiethoxysilane, 3) di- and tri-functional primary and secondary amines, such as isophorone diisocyanate, 1,6-hexamethylene diamine, 4,4'-methylenebis(N-secbutylcyclohexanamine), meta-xylylene diamine, and propane-1,2,3-triamine, and/or 4) hydroxyl-functional molecules, such as 1,5-pentanediol, 4,4'-isopropylidenedicyclohexanol, 1,4-cyclohexanedimethanol, and dendritic polyester polyols.

Some suitable organosilane polymers are disclosed in U.S. Pat. No. 10,190,020. (All publications and patent documents referred to throughout this application are incorporated herein by reference.) The organosilane polymer has terminal alkoxysilane groups formed by reacting an amine-functional alkoxysilane with a polyisocyanate to form an adduct. There is an excess of isocyanate groups relative to amine groups so that the adduct has an unreacted isocyanate group. The adduct is then reacted with a difunctional amino- or hydroxyl compound to consume all unreacted isocyanate groups. A typical reaction scheme is shown below. Note that the use of a diol forms urethane groups in the polymer. Alternatively, the difunctional amino- or hydroxyl compound can be reacted with the isocyanate first, followed by reaction with the amine-functional alkoxysilane to form the same compounds claimed herein. The claimed compounds may be made by either method. Each of the reactants may include more than one such compound of the general structure. Other reactants may be present or excluded.

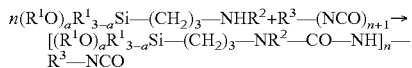

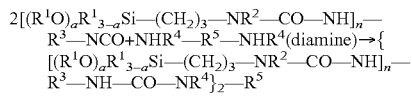

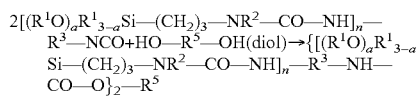

The value a is 1, 2, or 3, in that there is at least one alkoxy group bound to the silicon atom. The value n is a positive integer, in that the polyisocyanate has n+1 isocyanate groups. The organosilane polymer may be a mixture of the above compounds with other organosilane polymers. The mixture may include a small amount of polymer where all the isocyanate groups are reacted with amine-functional alkoxysilanes as shown below.

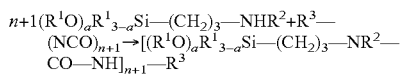

The reaction can also produce mixtures of compounds depending on the ratio of the reactants. For example, if greater than 50 mol % amine-functional alkoxysilane is used, some of the polyisocyanates will fully react with the amine-functional alkoxysilane, as shown above. If greater than 50 mol % NH or OH from difunctional amino- or hydroxyl compound is used, respectively, the reaction will produce some compounds with multiple repeat units (m) of the difunctional amino- or hydroxyl compound as shown below,

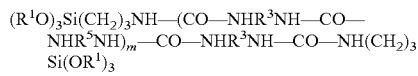

The organosilane polymer has no unreacted isocyanate groups. As used herein, "no unreacted isocyanate groups" means that enough isocyanate-reactive groups are used to react with all isocyanate groups, though it is possible that trace amounts of unreacted isocyanate remain.

Each $R^1$ group of the amine-functional alkoxysilane may be an independently selected alkyl group, such that all the $R^1$ groups are the same or may be of more than one type. Each $R^2$ group of the amine-functional alkoxysilane may be an independently selected hydrogen, aryl, alkyl, cycloalkyl, ester-containing aliphatic, ester-containing fluorinated aliphatic, amide-containing aliphatic, or polysiloxane. The amine-functional alkoxysilane is a different compound from the organosilane polymer itself, and may be free of urea and urethane groups. Suitable amine-functional alkoxysilanes include, but are not limited to, N-butyl-3-aminopropyltrimethoxysilane, 3-aminopropyltriethoxysilane, (N-cyclohexylmethyl)methyldiethoxysilane, 3-aminopropyltrimethoxysilane, 3-aminopropylmethyldiethoxysilane, N-methyl-3-aminopropyltrimethoxysilane, or N-[3-(trimethoxysilyl)propyl]-β-alanine butyl ester.

The $R^3$ group of the polyisocyanate may be aliphatic, cycloaliphatic, or aromatic. Aliphatic isocyanates may provide for better flexibility and weatherability in the coating. Suitable polyisocyanates include, but are not limited to, hexamethylene diisocyanate, a homopolymer of hexamethylene diisocyanate, toluene diisocyanate, isophorone diisocyanate, homopolymer of isophorone diisocyanate, or methylene diphenyl diisocyanate, and mixtures thereof. Commercially available polymeric isocyanates may include mixtures, such as dimers and trimers of hexamethylene diisocyanate.

Each $R^4$ group of the difunctional amino compound may be an independently selected hydrogen, aryl, alkyl, cycloalkyl, ester-containing aliphatic, ester-containing fluorinated aliphatic, amide-containing aliphatic, or polysiloxane. Each $R^5$ group of the difunctional amino- or hydroxyl compound comprises a cycloaliphatic or aromatic group, or any combination thereof. Suitable difunctional amino- or hydroxyl compounds include, but are not limited to, isophorone diamine; 1,6-hexamethylene diamine; 1,3,3-trimethyl-N-(1-methylethyl)-5-[(1-methylethyl)amino]cyclohexanemethanamine; 4,4'-methylenebis(N-secbutylcyclohexanamine); propane-1,2,3-triamine; 1,5-pentanediol; 4,4'-isopropylidenedicyclohexanol; 1,4-cyclohexanedimethanol; or a dendritic polyester polyol.

The alkoxysilane-terminated organosilane polymer may also be certain polyureas disclosed in U.S. Pat. No. 9,139,753 or 9,701,868, both of which are incorporated herein by reference, and certain subject matter thereof included below. The teachings of these applications may apply to the presently disclosed polyureas.

The polyisocyanate can be aliphatic, cycloaliphatic or aromatic. Aliphatic polyisocyanates are more weatherable (i.e., exterior durable) than aromatic polyisocyanates, thereby providing greater color stability when utilized for exterior coatings. Aliphatic polyisocyanates can have various numbers of reactive isocyanate (NCO) groups per molecule, depending on their structure. Typically, the number ranges from 2.5 to 5.5. For the present coating composition, the aliphatic polyisocyanate may have greater than 2 NCO groups per molecule. Suitable aliphatic polyisocyanates include, but are not limited to, structures based on isocyanurates (e.g., HDI and IPDI trimers), biurets, uretdiones, allophanates, oxadiazinetriones, iminooxadiazinedione, and prepolymers containing urethanes. Mixtures of these isocyanates can also be used. There are many commercially available aromatic, aliphatic, and cycloaliphatic polyisocyanates.

The N-substituted amino-functional alkoxysilane can be N-substituted 3-aminopropyltrialkoxysilane, N-substituted 3-aminopropylalkyldialkoxysilane or N-substituted dialkylalkoxysilane, where the alkyl group attached to the silicon atom can be methyl or ethyl, and the alkoxy group attached to the silicon atom can be methoxy, ethoxy, n-propoxy, or n-butoxy.

The N-substituted group of the N-substituted amino-functional alkoxysilane can be C1-C12 alkyl, cycloalkyl, or aryl. Examples include, but are not limited to, N-methyl-3-aminopropyltrimethoxysilane, N-ethyl-3-aminopropyltriethoxysilane, N-methyl-3-aminopropyltributoxysilane, N-ethyl-3-aminopropyltripropoxysilane, N-iso-propyl-3-aminopropyltrimethoxysilane, N-tert-butyl-3-aminopropyltrimethoxysilane, N-butyl-3-aminopropyltrimethoxysilane, N-butyl-3-aminopropylmethyldimethoxysilane, N-butyl-3-aminopropyldimethylmethoxysilane, N-butyl-3-aminopropyltriethoxysilane, N-butyl-3-aminopropyltripropoxysilane, N-butyl-3-aminopropyltributoxysilane, N-iso-butyl-3-aminopropyltrimethoxysilane, N-cyclohexyl-3-aminopropyltrimethoxysilane, N-hexyl-3-aminopropyltrimethoxysilane, N-nonyl-3-aminopropytrimethoxysilane and N-dodecyl-3-aminopropyltrimethoxysilane, and N-phenyl-3-aminopropyltrimethoxysilane. Many of these are commercially available.

The N-substituted group of the N-substituted aminofunctional alkoxysilane can also be an ester-containing aliphatic or ester-containing fluorinated aliphatic, which are formed by the Michael Addition (conjugate addition) reaction between a molecule with a reactive "ene" group, such as an acrylate, and 3-aminopropyltrialkoxysilane, 3-aminopropylalkyldialkoxysilane, or 3-aminopropyldialkylalkoxysilane. Conditions for forming Michael Addition adducts with an amine are well known in the literature. Suitable acrylates include, but are not limited to, methyl acrylate, ethyl acrylate, butyl acrylate, cyclohexyl acrylate, hexyl acrylate, 2-ethylhexyl acrylate, octyl acrylate, 4-tert-butylcyclohexyl acrylate, diethyl maleate, dimethyl maleate, dibutyl maleate, ethylene glycol methyl ether acrylate, 1,1,1,3,3,3-hexafluoroisopropyl acrylate, 2,2,2-trifluoroethyl acrylate, and 3,3,4,4,5,5,6,6,7,7,8,8-tridecafluorooctyl acrylate. Examples include, but are not limited to, methyl 3-((3-(trimethoxysilyl)propyl)amino)propanoate, butyl 3-((3-(trimethoxysilyl)propyl)amino)propanoate, 2-ethylhexyl 3-((3-(trimethoxysilyl)propyl)amino)propanoate, octyl 3-((3-(trimethoxysilyl)propyl)amino)propanoate, 3,3,3-trifluoropropyl 3-((3-(trimethoxysilyl)propyl)amino)propanoate, dimethyl (3-(trimethoxysilyl)propyl)aspartate, and diethyl (3-(trimethoxysilyl)propyl)aspartate.

The N-substituted group of the N-substituted aminofunctional alkoxysilane can also be an amide-containing aliphatic, which is formed by the Michael Addition (conjugate addition) reaction between a molecule with a reactive "ene" group, such as an acrylamide, and 3-aminopropyltrialkoxysilane, 3-aminopropylalkyldialkoxysilane, or 3-aminopropyldialkylalkoxysilane. Suitable acrylamides include, but are not limited to, N-ethylacrylamide, N-propylacrylamide, N-tert-butylacrylamide, N-cyclohexylacrylamide, N-ethyl maleimide, and N,N'-diethylmaleamide. Examples include, but are not limited to, N-propyl-3-((3-(trimethoxysilyl)propyl)amino)propanamide, N-butyl-3-((3-(trimethoxysilyl)propyl)amino)propanamide, N-cyclohexyl-3-((3-(trimethoxysilyl)propyl)amino)propanamide, and 1-ethyl-3-((3-(trimethoxysilyl)propyl)amino)pyrrolidine-2,5-dione.

A person skilled in the art understands that a small amount of isocyanate groups (e.g., 1-5%) could remain unreacted in the polymer, and thereby could be used to assist with adhesion to a substrate, or could be used to react with an isocyanate-reactive material that is not discussed herein. However, reacting a small percentage of the isocyanate groups on a polymer with a non-disclosed material is not expected to change the properties of the polymer, and should not be considered a separate polymer. For the purpose of making isocyanate-free coatings, it is recommended that all isocyanate groups be reacted during synthesis of the organosilane polymer.

Suitable solvents for synthesis of the organosilane polymer are those that are not reactive with isocyanate groups. These solvents include, but are not limited to, xylenes, light aromatic naphtha, mineral spirits, butyl acetate, 1-methoxy-2-propyl acetate, tert-butyl acetate, butyl propionate, pentyl propionate, ethyl 3-ethoxypropionate, 4-chlorobenzotrifluoride, tetrahydrofuran, 1,4-dioxane, dimethylacetamide, and N-methyl pyrrolidone.

A catalyst may be used to accelerate the rate of hydrolysis of the alkoxysilane groups and to facilitate crosslinking of the resulting silanol groups to form a cured coating. Suitable catalysts include, but are not limited to, organic tin compounds, such as dibutyl tin dilaurate, dibutyl tin diacetate, and dibutyl tin bis(2-ethylhexoate), metal alkoxides, such as titanium tetraisopropoxide, aluminum triethoxide, zirconium tetrabutoxide, and titanium chelates, including aminoalkoxysilanes, potassium hydroxide, organic acids, inorganic acids, tertiary amines, or mixtures thereof.

Suitable pigments include, but are not limited to, titanium dioxide, carbon black, red iron oxide, yellow iron oxide, copper phthalocyanine blue, sodium aluminum sulphosilicate, chromium oxide, cobalt chromite green spinel, chromium green-black hematite, nickel antimony titanium yellow rutile, and manganese-based pigments.

The polyamide polymer may be used to provide flexibility or thixotropic properties, and can be any polymer containing an amide group, including in the polymer backbone, and can be an aliphatic, cycloaliphatic or aromatic polyamide. Examples include, but are not limited to, fatty-acid based polyamides, dimerized fatty-acid based polyamides, paraphenylene terephthalamides, nylons, polyaspartates, and poly(hexamethylene adipamide).

The filler can be any material used to fill volume of the composition, tailor viscosity, or improve corrosion resistance. Examples include, but are not limited to, talc, ceramic microspheres, amorphous silica, hollow glass spheres, mica, aluminum flake, aluminum spheres, zinc particles, glass flake, wollastonite, and calcium carbonate.

Additives can be any material included in small amounts to tailor the viscosity, impact resistance, weatherability, or other properties of the composition. These additives include, but are not limited to, pigment dispersing agents, rubber beads, polyethylene fibers, polypropylene fibers, hindered amine light stabilizers (HALS), ultraviolet absorbers (UVAs), conductive polyaniline, and graphene.

The abrasive aggregate can be any particle that is incorporated into the composition that increases the coefficient of friction of the surface of the composition once the composition has solidified. It may be a rounded or angular particle consisting of 0.10-2.5 mm in size and 3-9 Mohs hardness. Examples include, but are not limited to, brown aluminum oxide, white aluminum oxide, walnut shells, aluminum, crushed glass, glass beads, corn cob, melamine, acrylic, and urea.

When the composition is applied to a surface, it may cure to form a solid coating. The alkoxysilane groups of the organosilane polymer undergo hydrolysis and condensation with each other.

Unlike two-component nonskid coatings, the single-component polysiloxane nonskid is an all-in-one-can system that does not require metering and mixing of components. The nonskid may be easy to stir and apply, yet provides an aggressive and hard profile once cured. The silicon-oxygen bonds within the coating provide greater resistance to degradation from sunlight than polymers based on all-organic bonds, such as those used in epoxy-amine nonskids, thus the 1K nonskid may retain its color and profile for longer periods of time. A 1K nonskid that provides enhanced exterior durability can extend the service life of nonskids on ship decks and reduce maintenance costs.

The following examples are given to illustrate specific applications. These specific examples are not intended to limit the scope of the disclosure in this application.

Example 1

Synthesis of Organosilane Polymer—

An aliphatic isocyanate based on hexamethylene diisocyanate uretdione (Desmodur N-3400, Covestro) is dissolved in 4-chlorobenzotrifluoride (Sigma-Aldrich) (~1.2/1 by weight isocyanate/solvent) in a 1 L 4-neck round bottom flask equipped with a nitrogen inlet, mechanical stirrer, and thermometer. Next, vinyltrimethoxysilane (Gelest) is added as a moisture scavenger. Using an addition funnel, N-butyl-3-aminopropyltrimethoxysilane (Gelest) (3/5 ratio of equiv. NH to equiv. NCO) is added dropwise to the solution while keeping the temperature at 50-60° C. Once the addition is complete, aliphatic-cyclic diamine 1,3,3-trimethyl-1-aminomethyl-5-aminocyclohexane (Clearlink 1080, Dorf Ketal) (2/5 ratio of equiv. NH to equiv. NCO) is added dropwise, again keeping the temperature at 50-60° C. After addition, the reaction is stirred for an additional 30 minutes to 1 hour until all isocyanate groups are consumed according to FTIR analysis. A structure of one polymer made from the reaction is shown in FIG. 1.

Example 2

Single-Component Non-Skid/Non-Slip Formulation—

Figure 2:
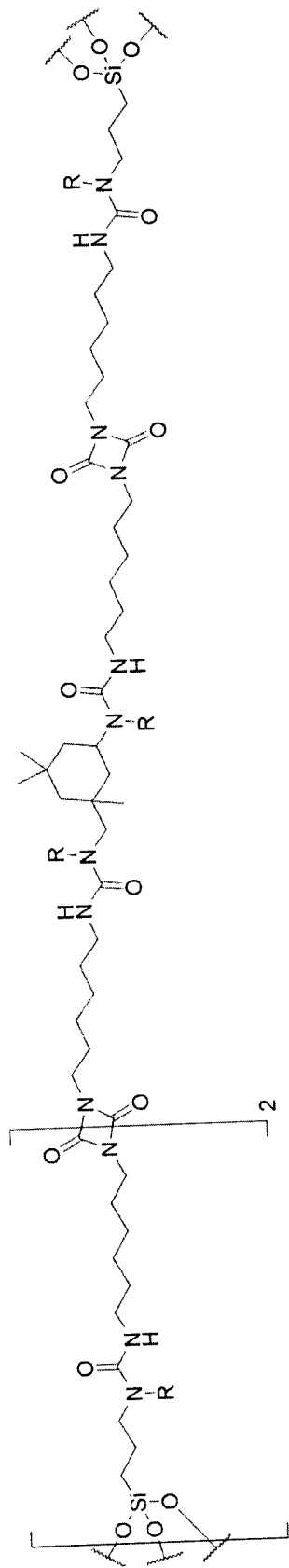
FIG. 2 shows the organosilane polymer when cross-linked (cured).
Figure 3:
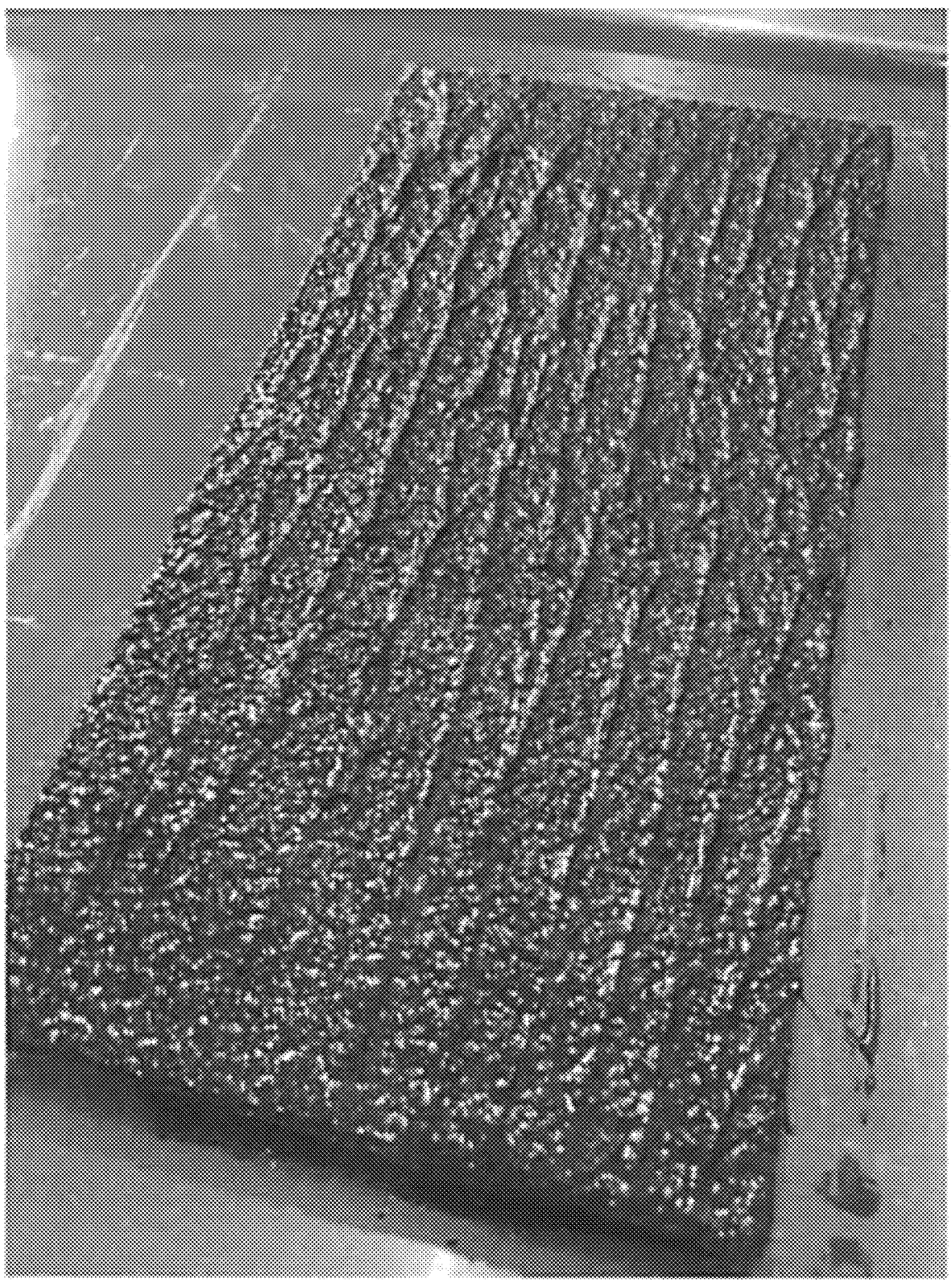
FIG. 3 shows a photograph of the single-component (1K) non-skid/non-slip coating after application with a napless phenolic roller on a 6"×12"×¼" epoxy-primed panel.

A single-component non-skid/non-slip coating is prepared by mixing organosilane polymer from Example 1 with titanium dioxide (R-960, Chemours), inorganic black pigment (Black 30C940, Shepherd Pigments), inorganic blue pigment (Blue 300527, Shepherd Pigments), and ceramic microspheres (W-610, 3M). This is followed by the addition of an amide-containing polymer (Crayvallac PA4BA20, Palmer Holland), fibrillated high-density polyethylene fibers (Mini Fibers, Inc.), 12-30 mesh glass beads (Blast-O-Lite), and dibutyltin dilaurate (Sigma-Aldrich). The percentage ranges in the formulation are given in Table 1. Once mixed, the coating is applied over an epoxy-primed steel panel using a 9-inch napless phenolic roller (Grainger), then allowed to cure at 72° F. and 40-60% relative humidity for 14 days. FIG. 2 shows a structure of one cross-linked (cured) organosilane polymer made from the reaction. FIG. 3 shows an example rolled non-skid/non-slip coating after overnight cure. The polysiloxane coating is hard-to-touch after one day.

The amount of organosilane polymer to use depends on the application. For example, a non-slip formula for stairs would use a high percentage of polymer and a low percentage of aggregate and filler. A high friction non-skid surface for roadways would use a lower percentage of polymer and a higher percentage of aggregate and filler.

TABLE 1

| Material | Wt. % |
| --- | --- |
| Organosilane polymer | 20-80% |
| Titanium dioxide | 0.1-0.5% |
| Black pigment | 1-3% |
| Blue pigment | 0.1-0.5% |
| Ceramic microspheres | 5-50% |
| Polyamide | 1-10% |
| Fibers | 0.1-0.5% |
| Glass beads | 5-60% |
| Dibutyltin dilaurate | 0.1-1.0% |

Obviously, many modifications and variations are possible in light of the above teachings. It is therefore to be understood that the claimed subject matter may be practiced otherwise than as specifically described. Any reference to claim elements in the singular, e.g., using the articles "a", "an", "the", or "said" is not construed as limiting the element to the singular.

What is claimed is:

1. A composition comprising:
   an organosilane polymer made by a method comprising:
      reacting an amino-functional alkoxysilane with one or more polyisocyanates to form one or more adducts having an unreacted isocyanate group; and
      reacting the adducts with one or more polyfunctional amino- and/or hydroxyl compounds so that the polymer contains no unreacted isocyanate groups;
      wherein the polyfunctional amino- and/or hydroxyl compound comprises a cycloaliphatic group or an aromatic group;
   a polyamide polymer; and
   an abrasive aggregate.

2. The composition of claim 1, wherein the amino-functional alkoxysilane is N-butyl-3-aminopropyltrimethoxysilane, 3-aminopropyltrimethoxysilane, or (N-cyclohexylmethyl)methyldiethoxysilane.

3. The composition of claim 1, wherein the polyisocyanate is hexamethylene diisocyanate, a homopolymer of hexamethylene diisocyanate, toluene diisocyanate, isophorone diisocyanate, homopolymer of isophorone diisocyanate, or methylene diphenyl diisocyanate.

4. The composition of claim 1, wherein the polyfunctional amino- and/or hydroxyl compound is isophorone diamine; m-xylylene diamine; 1,3,3-trimethyl-N-(1-methylethyl)-5-[(1-methylethyl)amino]cyclohexanemethanamine; 4,4'-methylenebis(N-secbutylcyclohexanamine); 4,4'-isopropylidenedicyclohexanol; 1,4-cyclohexanedimethanol; or a dendritic polyester polyol.

5. The composition of claim 1, wherein the polyamide polymer contains aliphatic groups, aromatic groups, or both.

6. The composition of claim 1, wherein the abrasive aggregate is a rounded or angular particle.

7. The composition of claim 1;
   wherein the abrasive aggregate is a particle having an average diameter of 0.10-2.5 mm; and
   wherein the abrasive aggregate has an average hardness of 3-9 Mohs.

8. The composition of claim 1, further comprising:
   a solvent, a pigment, a filler, an additive, or a catalyst.

9. A method comprising:
   applying the composition of claim 1 onto a surface; and
   allowing the composition to cure by reaction of the alkoxysilane groups with atmospheric moisture and subsequent condensation of silanol groups.

10. A single-component polysiloxane non-skid/non-slip coating made by the method of claim 9.

11. The single-component polysiloxane non-skid/non-slip coating of claim 9, wherein the composition is applied by rolling, spraying, or troweling.

* * * * *